W. McC. NEALE.
PROCESS OF OIL EXTRACTION FROM SEED KERNELS.
APPLICATION FILED MAR. 4, 1914.
1,164,383.
Patented Dec. 14, 1915.
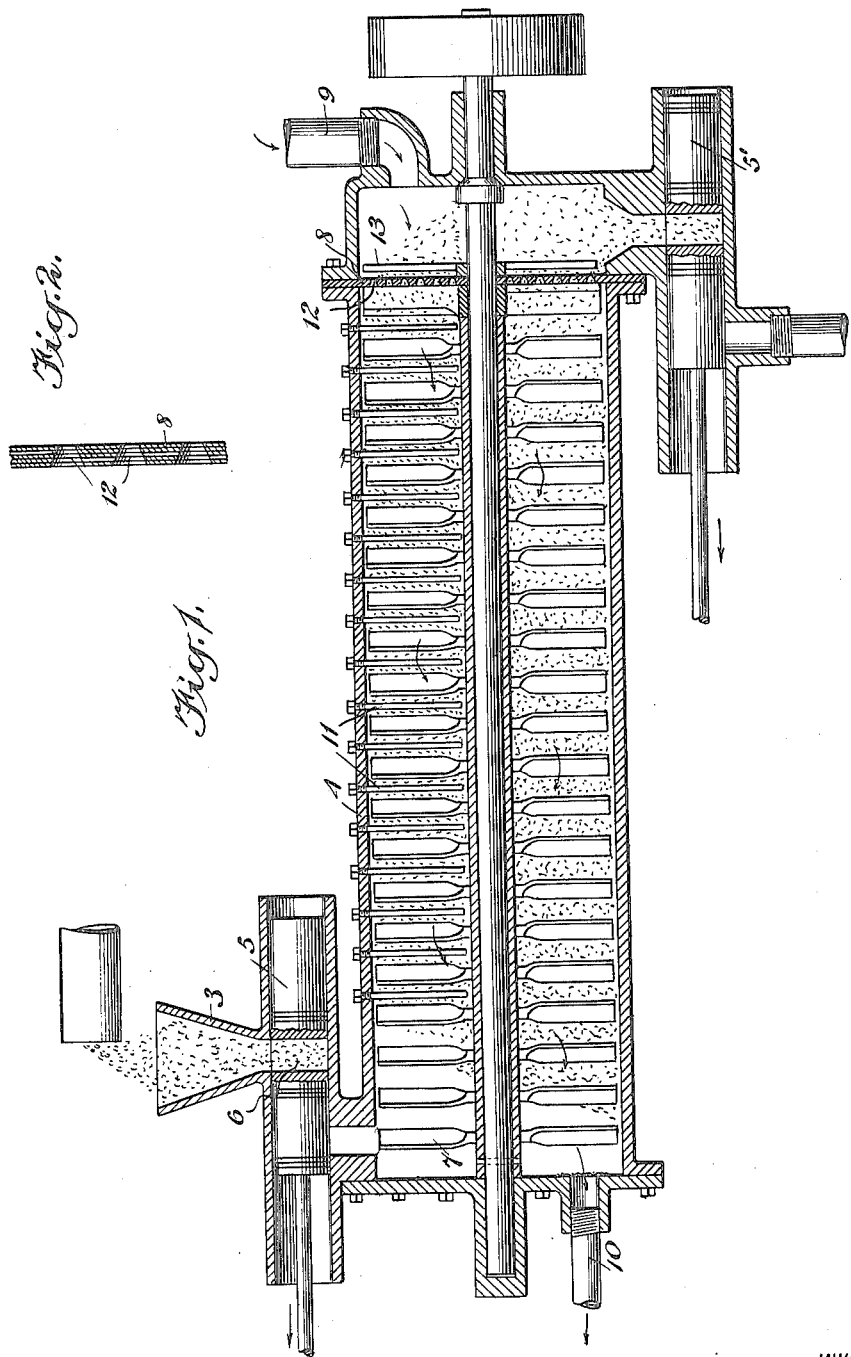

UNITED STATES PATENT OFFICE.

WILLIAM McCORMICK NEALE, OF GREENVILLE, SOUTH CAROLINA.

PROCESS OF OIL EXTRACTION FROM SEED-KERNELS.

1,164,383.  Specification of Letters Patent.  Patented Dec. 14, 1915.

Application filed March 4, 1914. Serial No. 822,317.

*To all whom it may concern:*

Be it known that I, WILLIAM McC. NEALE, a citizen of the United States, and a resident of Greenville, in the county of Greenville and State of South Carolina, have invented a new and Improved Process of Oil Extraction from Seed-Kernels, of which the following is a full, clear, and exact description.

My invention relates to the process of extracting oil from oil-bearing seed kernels, and has reference more particularly to the heating or cooking part of the process.

An object of the invention is to provide a simple and efficient process whereby the yield of oil per ton of seed is greatly increased and a better quality of oil is obtained.

A further object of the invention is to insure a thorough heating of every minute particle of the seed kernel and to make the process of heating more exact.

A still further object of the invention is to produce the proper quantity of thoroughly heated seed kernels at the proper time, when they can be compressed at once without having to be stored and thus lose their moisture and heat, both of which are very essential to the extraction of oil therefrom.

I attain the above objects by testing the crushed seed kernels for moisture and then subjecting the so-crushed seed kernels to a hot current of predetermined moisture and temperature, the said seeds being prevented from agglomeration when subjected to the current so as to expose a maximum surface of contact to said current.

In the present practice it is found advisable to press the oil bearing seeds two or more times, for the reason that oil produced from the kernels pressed when cold sells for a greater price than the oil obtained from the kernels when heated. My process applies only to the second or third pressing, or when the kernels require heating or cooking. The proper condition of the celluloid structure of the kernel which contains the oil determines the ease with which the oil can be extracted. Of course the viscosity of the oil within the cell has a bearing upon the ease of extraction; but as I will attempt to show later, no matter what its viscosity may be it would be very hard to extract any appreciable amount of oil if the cell walls are not in the proper condition even after they have been crushed.

It is common practice to pass the kernels through crushing rolls, which presumably breaks every oil cell; next they are heated, and at one point early in the process of heating they become very mushy and if pressed at this point the oil yield is low because there is considerable moisture in the cell walls that have been crushed and they easily slide over one another and cover up any path of escape that the oil may have found. That is to say, the pressure on all sides of the oil globule is uniform and, consequently, there is no movement of the same. Now, if the heating process is prolonged after the meats become mushy, the meats will gradually become less and less mushy, due to the evaporation of the moisture from the cell walls, or what were the walls before they were crushed. This prolonged heating makes the meats dry and the oil yield is low, due, I believe, to the fact that the meats become hard and the crushed particles which formed the cells bridge the oil globules.

In the above explanation I have attempted to show the two extremes in the heating process and their effects, and how difficult it is to strike the happy medium of just the exact point to which to heat the meats in order to get the maximum of oil therefrom. I may also add in this connection that there may be, and most probably are, other reasons for the low oil yield when the meats are pressed, both when they are not sufficiently cooked and after they have been overcooked, but the above reason seems to state the case in a more explicit way. One other reason upon which the yield of oil seems to depend very largely is the amount of hull and lint left in the mass of meats, in the case of cotton seed.

To obviate the above defects, after the meats have passed through the crushing rolls in the usual way, *i. e.*, after they have been hulled, I test them for moisture, which can be done in the mill a few times a day, serving as an index to the amount of moisture that should be added or subtracted from the meats after the same have passed through the crushing rolls. In place of testing the meats, they can be thoroughly saturated with moisture and then the amount of moisture therein reduced so that the meats will contain a certain definite amount of moisture per pound of mass. The moisture in the crushed mass in the Eastern States varies from 8% to 17½%, so that the average is about 10%. In the Western States the minimum of moisture in the mass is 6.4%, the maximum 15.4, the average being, also, about 10%. The moisture added or subtracted depends upon the moisture in the air the day the mass is worked. The meats containing a predetermined amount of moisture are passed slowly through an inclosed chamber, or a series of inclosed chambers, under pressure and through which chamber or chambers a heat carrying substance is made to pass in an opposite direction. Suitable arrangements are made to vary the pressure in the chambers between wide limits. The heat carrying substance is preferably a mixture of superheated steam and air in proportions suitable to the pressure existing in the chambers for the meats to be cooked therein. Also the degree of superheated steam may be varied according to the quantity of moisture to be taken from or added to the meats and the number of calories required per pound of mass to thoroughly cook the meats.

Moisture must be lowered to about 5% as quickly as possible after the meats enter the first machine of the series and kept down until they enter the final machine, when moisture is again added, if necessary, according to the manner of the final pressing. Moisture in the meats after coming through all the machines, based on the chemist's report of moisture in the cake, must be about as follows, according to the manner of accomplishing the final pressing: Using the ordinary flat box press with camel's hair cloth, 5 to 8 per cent. Using the expeller with no cloth coming in contact with the meats, 3 to 5 per cent. Using my continuous press (on which an application has been filed, Serial No. 859,990) 4 to 6 per cent. Therefore, the meats coming out of the series of machines should contain about 8 per cent of moisture.

The cooking chamber I prefer to use is illustrated in longitudinal section in Fig. 1 of the accompanying drawings. The crushed seeds are delivered to a hopper 3, from where they are distributed to the cooking chamber 4 by a reciprocating piston 5. The quantity delivered at each stroke to the chamber is determined by the size of the transverse aperture 6 formed in said cylinder, and also by the speed with which the piston 5 reciprocates. The meats delivered by the piston 5 to the cooking chamber are forwarded from one end to the other of the cylinder by means of the screw-shaped paddles 7 mounted to rotate within said chamber 4. The end of the cylinder or chamber 4 to which the meats are fed by the paddles 7 is provided with a perforated plate 8, preferably formed of a series of contacting laminæ 12 (see Fig. 2) which is an enlarged cross-section of the perforated plate 8.

The air and superheated steam are supplied to the chamber through a tube 9 provided at the end adjacent the plate 8; and the outlet 10 for the superheated steam and air is provided at the opposite end of the chamber, i. e., adjacent the feeding end of said chamber 4. To prevent the soggy meats from forming a revolving mass, stationary members 11 are provided within the chamber 4 which are combed by the revolving paddles, thus breaking up the particles tending to agglomerate, thereby exposing the maximum surface of said particles to the heated current flowing from the inlet 9 to the outlet 10. The speed with which the meats are fed from the meat inlet to the meat outlet of the chamber depends on the pitch of the paddles 7. The perforations 12 through which the meats are forced by the paddles are cone shaped. Part of the oil in said meats can be extracted when said meats are passing through said plate formed of laminæ by providing conduits between the laminæ so as to convey the oil formed by the pressure forcing the meats through the plate. This extraction of oil in the plate 8 is only an alternative which may be used or not as desired. The meats passing through the plate 8 are scraped off therefrom by rods 13 provided on the shaft which carries the paddle 7. The meats passing through the chamber 4 are discharged to a cylinder 5' similiar to the cylinder 5 and similarly actuated for delivering the meats from the chamber to a predetermined place where they are immediately forced into cakes of the proper size, with a press cloth around each, and compressed.

The importance of mixing the meats while the same are under the action of the heating current is that the mass is prevented from agglomerating and, therefore, each particle is thoroughly cooked to a proper temperature. The heating current containing a proper moisture prepares the meats of the kernels so that when the same leave the heating chamber they are in proper condition for the pressing process.

Having thus described my invention, I claim as new and desire to secure by Letters Patent:

1. The process of oil extraction from seed kernels consisting in crushing the kernels, feeding the crushed mass while preventing the agglomeration of the same, heating the said mass by a current of superheated steam and air discharged and forced to flow in a direction opposite to the direction in which the mass is fed, forming cakes of the heated mass, and compressing the said cakes.

2. The process of oil extraction from seed kernels consisting in crushing the kernels, then feeding the mass through a closed chamber heated by a current of steam and air forced through the chamber in a direction opposite to the mass fed, extracting part of the oil from the mass as the same is forced through the chamber, then shaping the mass passed through the chamber into cakes and pressing them.

3. The process of oil extraction from seed kernels consisting in crushing the kernels, feeding the crushed mass through a closed chamber heated by a hot current of mixed fluid entering the chamber in a direction opposite to the mass fed, stirring or beating said mass within the chamber to finally break up the same so as to prevent agglomeration of particles during the cooking process, extracting part of the oil from the mass as the same is forced out of the chamber, then shaping the mass passing through the chamber into a cake and pressing same.

4. The process of oil extraction from seed kernels consisting in crushing the kernels, feeding the crushed mass through a closed chamber heated by a current of steam and air entering the chamber in a direction opposite from that in which the mass is fed, stirring or beating the mass within the chamber to prevent agglomeration of particles, extracting part of the oil from the mass as the same is forced through the chamber, then pressing the mass.

In testimony whereof I have signed my name to this specification in the presence of two subscribing witnesses.

WILLIAM McCORMICK NEALE.

Witnesses:
WILLIAM L. WILSON,
CHARLES D. BLACKWELDER.